United States Patent
Peruglia

[11] 3,825,032
[45] July 23, 1974

[54] AUTOMATIC UNIDIRECTIONAL THROTTLE

[75] Inventor: Marco Peruglia, Turin, Italy
[73] Assignee: FIAT Societa per Azioni, Turin, Italy
[22] Filed: July 28, 1972
[21] Appl. No.: 275,994

[30] Foreign Application Priority Data
Sept. 2, 1971 Italy .................................. 69918/71

[52] U.S. Cl. ................. 137/496, 137/501, 137/510
[51] Int. Cl. ........................................... F16k 15/14
[58] Field of Search ............ 137/110, 501, 510, 496

[56] References Cited
UNITED STATES PATENTS
2,192,042   2/1940   Hoffmann .......................... 137/501
3,343,559   9/1967   Goplen ........................... 137/510 X
3,502,100   3/1970   Jonson ............................ 137/501 X

*Primary Examiner*—Harold W. Weakley
*Attorney, Agent, or Firm*—Sughrue, Rothwell, Mion, Zinn & Macpeak

[57] ABSTRACT

A restrictor throttle valve having two modes of operation depending on the balance of pressures therewithin. The valve has only input and output ports and allows initial free flow therebetween while the pressure in a control chamber builds up via a restrictor throttle opening which connects the control chamber with the inlet port. After the pressure in the control chamber has reached a maximum, which takes a short time after the initial application of pressure to the inlet port, any subsequent change in pressure leading to a pressure drop at the outlet port causes a valve shutter to be closed by the pressure in the control chamber. When the valve shutter is closed the inlet and outlet ports can only communicate via a restrictor throttle so that any subsequent changes in pressure must take place gradually. This is particularly useful for anti-skid braking systems where, after the initial, unobstructed, application of the brakes, any subsequent changes, during a braking operation, are due to the anti-skid device and are required to take place gradually, both for passenger comfort and for vehicle stability.

1 Claim, 2 Drawing Figures

PATENTED JUL 23 1974
3,825,032

AUTOMATIC UNIDIRECTIONAL THROTTLE

BACKGROUND OF THE INVENTION

The present invention relates to an automatic unidirectional delivery throttle for pneumatic circuits. Embodiments of the present invention find particular utility in pneumatic anti-skid braking systems for vehicles.

In anti-skid braking systems, in which, if skidding is imminent, the brake actuator is repeatedly released and reapplied during a single braking operation, it is necessary for the variations in braking pressure not to be too rapid so that the brakes are released and reapplied gradually. This requirement must be fulfilled so that the stability of the vehicle is not jeopardised due to shuddering or other reactions on the steering, and also to avoid discomfort for the occupants of the vehicle.

The required gradual release of braking pressure during anti-skid operation has been achieved by previously known devices, for example, one known device allows free application of a pneumatic pressure to the brake by a distributor but restricts the flow of fluid to the brakes during operation of the anti-skid control device, thereby achieving the desired gradual application of braking pressure during anti-skid braking, whilst allowing normal operation of the braking system when the anti-skid control device is inactive.

However, although known such restrictor throttles do operate in the required manner, they are relatively complicated and costly, because they include a large number of parts such as springs, a number of seals, and various different throttled passages which require precision machining during manufacture. Moreover, known throttles also include a control port in addition to an inlet port and an outlet port, both of which are connected into the pressure delivery pipe, the third control port being connected to a branch pipe.

OBJECTS OF THE INVENTION

The object of the present invention is to achieve an automatic unidirectional throttle valve suitable for anti-skid braking systems, capable of allowing unrestricted flow of fluid under normal conditions, and operative to restrict the flow of fluid upon actuation of a control device.

SUMMARY OF THE INVENTION

According to the present invention, there is provided an automatic throttle valve suitable for a pneumatic anti-skid braking system for vehicles, the valve including an inlet port, and an outlet port, characterised in that the inlet port communicates with the outlet port via a first flow restrictor throttle and also via a passageway closable by a shutter, and communicates with a control chamber via a second flow restrictor throttle, the shutter being subject to the pressure in the control chamber and to that in the passageway and movable to close the passageway when the pressure in the control chamber is greater than the pressure in the passageway.

It will be appreciated that one advantage of embodiments of this invention is that they consist of a small number of parts, are easy to manufacture and comprise a minimal number of sealings.

Since embodiments of the invention can be formed with only two ports, one inlet, and one outlet, they may therefore be located in an anti-skid braking system simply by being inserted in series into the conduit which connects the outlet of the distributor valve to the inlet of the brake actuator, without any modifications to the pneumatic braking circuit being required.

Various other features and advantages of the invention will become apparent during the course of the following description with reference to the accompanying drawings, which is given by way of non-restrictive example only.

DESCRIPTION OF THE PREFERRED EMBODIMENTS

Figure 1:
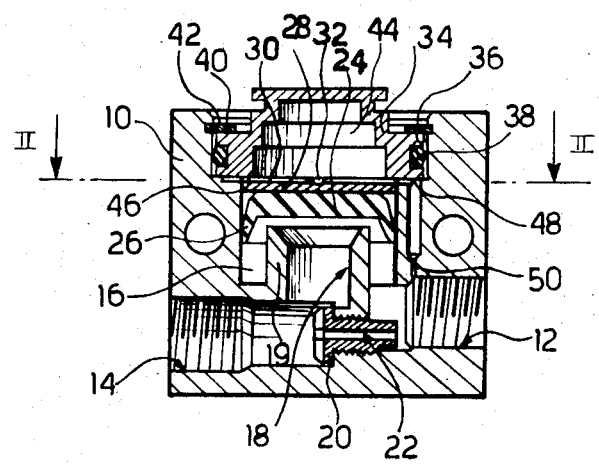
FIG. 1 is an axial, sectional view of the embodiment.

Referring now to the drawings, there is shown a valve casing 10 which has an inlet port 12 and an outlet port 14. When connected in an anti-skid braking system, for which it is particularly suitable, the inlet port 12 would be connected to the pressure distributor valve and the outlet port 14 would be connected to the inlet of the brake actuator. The valve 10 is shown in a convenient orientation, and will thus be described in this orientation although it will be appreciated that it will operate in any orientation. The inlet port 12 communicates with an annular chamber 16 which, in turn, communicates with the delivery port 14 through a communication port 18 which is separated from the annular chamber 16 by an annular ridge 19. Directly connecting the ports 12 and 14 there is a threaded hole into which is screwed an element 20 which has an axial restrictor throttle passage 22.

A shutter 24, of rubber or other suitable resilient material, having an axial annular flange 26 which engages the outer wall of the annular chamber 16 to form a seal with it, has on the face opposite the flange 26 a metal disc 28 secured thereto. The shutter 24 is movable to close the communication port 18 by pressing against the upper edge of the annular ridge 19, when the pressure on the face to which the metal disc is attached is greater than that on the other face.

A metal cup 34 is located in a bore 36 in the casing 10, adjacent the chamber in which the shutter 24 and the cap 28 are located. The cup 34 has an O-ring sealing 38 and is held in position by a circlip 40 fitted into a groove 42. The interior of the cup 34 forms a control chamber 44. When the shutter 24 is raised, the periphery of the disc 28 bears against a rim 46 of the cup 34.

Figure 2:
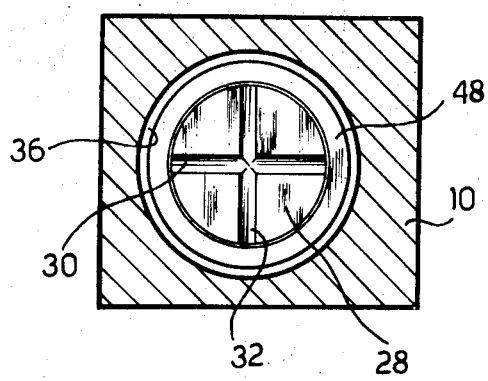
FIG. 2 is a sectional view along the line II—II of FIG. 1.

The inlet port 12 also communicates with an annular chamber 48 formed by the rim of the cup 34 and an annular shoulder at the end of the bore 36, via a throttled passage 50. The annular chamber 48 communicates with the control chambers 44 via two grooves 30 and 32 in the disc 28, as shown in FIG. 2.

OPERATION

The valve described above operates as follows. When pressure is applied to the inlet port 12, fluid is passed through the passage 50, the annular chamber 48, and along the grooves 30, 32 to the control chamber 44. The passage 50, however, delays the increase of pressure in the chamber 44 so that this occurs gradually.

On the other hand, the fluid passes freely into the annular chamber 16, and thence to the communication port 18, so that a corresponding pressure is applied to the delivery port 14, more or less instantaneously. The pressure in the annular chamber 16 thrusts the shutter 24 upwards (in the orientation shown in FIG. 1) since the pressure in the chamber 44 takes some time to reach the same value as the pressure in the annular chamber 16.

Should there be a sudden reduction in pressure at the outlet port 14, such as when an anti-skid braking system operates to release the brakes, the shutter 24 is thrust downwards by the sudden reduction of pressure in the communication port 18, since the pressure in the control chamber 44 is now greater than the pressure in the communication port 18. Thus, when the brakes are reapplied, that is when the anti-skid device ceases to release the braking pressure, the fluid can flow from the inlet port 12 to the delivery port 14 only via the restrictor throttle 22, since the pressure in the control chamber 44 keeps the shutter 24 down, thus preventing communication between the inlet port 12 and the outlet port 14 via the communication port 18. The pressure at the delivery port 14 thus increases gradually.

This effect will be repeated for all the subsequent releases and re-applications of the braking pressure during the same braking operation, since the pressure in the control chamber 44 is maintained by the communication between the port 12 and the chamber 44.

At the end of the braking operation, when the pressure at the inlet port 12 is released, the control chamber 44 discharges via the restrictor throttle 50 and the edge 26 of the shutter 24 relaxes since this is no longer maintained pressed against the side wall of the chamber 16 by pressure. The valve is thus returned to its initial conditions and is ready to operate again during the next braking operation to allow unrestricted flow if the brakes are operated normally, or controlled gradual flow if the anti-skid device operates during the braking operation.

We claim:
1. An automatic throttle valve comprising:
a valve casing,
means defining an inlet port in said valve casing,
means defining an outlet port in said valve casing,
means defining a first flow restrictor throttle connecting said inlet port and said outlet port,
means defining a passageway connecting said inlet port and said outlet port,
valve shutter means in said passageway, said valve shutter means being movable between a first position where it closes said passageway and a second position where it allows fluid flow along said passageway, said valve shutter means comprising an element of resilient material and a metal disc, said metal disc being secured by one face to one face of said resilient element and having radial grooves in the free face thereof,
means defining a control chamber in said valve casing,
means defining a second restrictor throttle in said valve casing, said second restrictor throttle connecting said inlet port and said control chamber means,
an abutment stop in said control chamber, said metal disc abutting said abutment stop when said valve shutter is in said second position, said control chamber communicating with said second flow restrictor throttle via said radial grooves when said valve shutter is in said second position,
means connecting said control chamber means and said valve shutter means whereby said valve shutter means is moved to said first position when the pressure in said control chamber means is greater than the pressure in said passageway such that fluid flow between said inlet port and said outlet port can only occur through said first flow restrictor throttle.

* * * * *